United States Patent [19]
Apalikov et al.

[11] 3,900,147
[45] Aug. 19, 1975

[54] METHOD OF CLADDING METAL ARTICLES

[76] Inventors: Jury Ignatievich Apalikov, prospekt Lenina, 96, kv. 44; Jury Alexeevich Konon, ulitsa Novaya, 6, kv. 41; Leonid Borisovich Pervukhin, ulitsa Jurina, 116, kv. 40; Boris Davydovich Tsemakhovich, prospekt Lenina, 69, kv. 41, all of Barnaul, U.S.S.R.

[22] Filed: Nov. 13, 1972

[21] Appl. No.: 306,348

[52] U.S. Cl............................... 228/107; 228/109
[51] Int. Cl............................................. B32b 15/00
[58] Field of Search............................ 117/22, 130

[56] References Cited
UNITED STATES PATENTS

| | | | |
|---|---|---|---|
| 3,395,444 | 8/1968 | Davis et al. | 117/22 |
| 3,473,943 | 10/1969 | Kai | 117/22 |

*Primary Examiner*—J. Travis Brown

[57] ABSTRACT

A cladding article with a charge of detonating explosive is located on the cladded article with a predetermined spacing between them. The value of this spacing is maintained on the entire welding surface by means of metal elements which are physically separated from the welding articles.

Each metal element is provided with a cavity open at the ends, with the ends of the walls confining the cavity facing the welding surfaces of the articles. The thickness of the wall should be, at least, by one order smaller than the thickness of the cladding article.

The metal elements are located so that a sufficient number of them with their ends contact simultaneously the welding surfaces to hold reliably the cladding article with a charge of detonating explosive on the cladded article.

The cladding is accomplished by explosive welding.

1 Claim, 3 Drawing Figures

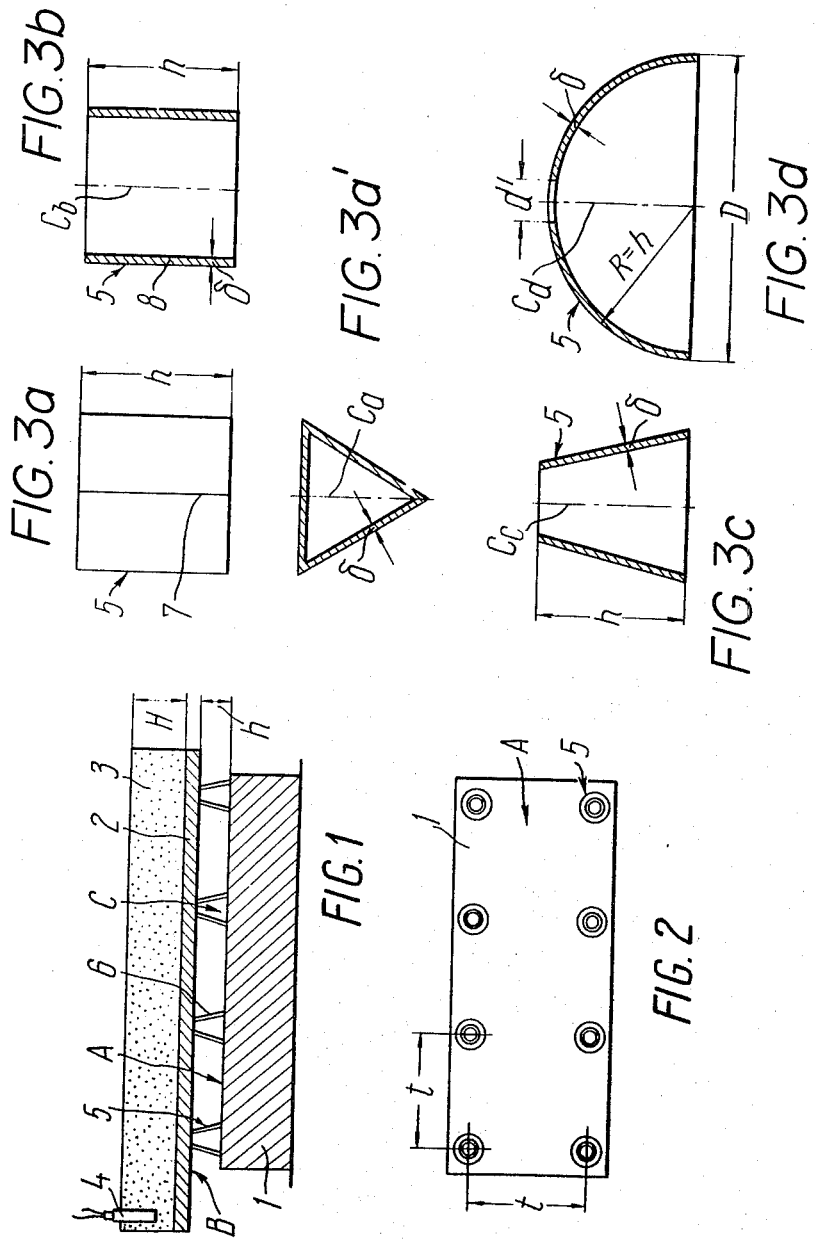

METHOD OF CLADDING METAL ARTICLES

The present invention relates to methods of cladding articles, and more particularly, to methods of cladding metal articles by explosive welding.

The invention can most effectively be utilized for metal articles to be cladded with a relatively thin sheet (up to 10 mm thick) having a large area (about 20 m$^2$) and for especially important metal articles wherein more stringent requirements are imposed on the quality and uniformity of the welding joint characteristics.

There is known a method of cladding metal articles by explosive welding wherein the cladding article carrying a charge of detonating explosive is located on the article to be cladded so that between their welding surfaces facing each other there is a spacing whose size is maintained uniform throughout the entire welding surface by means of scattered metal elements.

This method provides such a location of the cladding and the cladded articles where the spacing between their welding surfaces amounts to, at least, 0.0254 mm. The metal elements used to maintain this spacing between the welding surfaces, according to the said known method, are either scattered projections constructed on the welding surface of the cladding article or scattered metal particles of comparatively equal size (particles resembling metal pellets) located between the welding surfaces.

It is well known that the metal elements which form the required spacing between the welding surfaces of the articles to be cladded by means of explosion energy, remain in the welding joint.

The size of the spacing between the welded surfaces, as a rule, greatly depends on the thickness of the cladding article, i.e. the cladding sheet. The larger the thickness of the cladding article, the larger the size of the spacing between the welding surfaces of the articles to be bonded.

The experience gained in practice has shown that the most favourable size of the spacing is within the range of one to two thicknesses of the cladding article.

If the cladding sheet, being 0.5–6.0 mm thick, has an area of about 20 m$^2$ (in case of cladding large-size articles), it can have essential deviations from being flat-surfaced since such a sheet is, as a rule, welded.

The pre-welding of a sheet of such a size can bring considerable deformations which cannot be completely removed in the course of subsequent straightening.

While locating such a cladding sheet on the cladded article with a pre-determined spacing, it is necessary to eliminate the possibility of individual local contacts of the welding surfaces, since there will be no spacing in the places of such contacts which in the course of welding will result in a non-continuous welding joint.

In this case the spacing between the welding surfaces should be increased amounting to 1.0 – 12.0 mm, while the thickness of the cladding sheet is 0.5 – 6.0 mm. It is quite obvious that the larger the size of the spacing between the welding surfaces, the larger the size and, consequently, the larger the mass of the metal elements used to maintain this spacing.

Therefore, the size of the elements used to maintain a uniform spacing on the entire welding surface should also be within the range of 1.0 to 12.0 mm.

As a result, the metal elements provided in the said known method will possess a high rigidity and a large mass which accounts for their slow "acceleration" and increasing resistance to deformations in the process of explosive welding. The utilization of scattered massive metal particles to maintain the spacing results, in this case, in non-desirable phenomena.

During explosive welding such metal particles can lead either to a puncture in the cladding sheet or to its considerable deformations which can be noted on the outside providing an apparent spoilage. The introduction of such elements into the cladding article or the cladded article also results in non-stable physico-mechanical qualities of the welding joint and can serve as a nucleus of crack formation in the operating process of the article.

Besides, a considerable amount of the explosion energy is expended to overcome the high rigidity (resistance to deformation) of such metal particles which increases with their deformation.

This results in increasing the thickness (height) of the charge of detonating explosive which, in turn, brings about during welding a considerable number of "melted" areas in the welding joint zone.

The "melted" sections reduce the operating qualities of the cladded article.

To construct the metal elements in the form of projections on the welding surface of the cladding article is a laborious operation and for the case of cladding with a relatively thin sheet, it is practically not always possible to construct the said projections. Besides, experiments have shown that the abrupt transitions in the places where the projections conjugate with the cladding article inevitably result in microcracks appearing in the areas of such transitions which are the concentrators of stresses, or at the best, impair the process of wave formation in the welding joint and, therefore, do not provide a stable strength on the entire welding surface.

An important object of the present invention is to provide a method of cladding metal articles by explosive welding involving such metal elements for maintaining a spacing between the welding surfaces that would possess a sufficient static rigidity.

Another important object of the present invention is to provide the above-mentioned method involving the utilization of such said metal elements that would acquire a steeply increasing strength characteristic of the scattering elements under the effect of the abrupt movement of the cladding article in the process of welding.

Another, no less important, object of the present invention is to provide a method similar to the above-mentioned that would ensure a highly qualitative weld joint with stable physico-mechanical characteristics on the entire welding surface.

The said and other objects are attained by means of the proposed method of cladding metal articles by explosive welding wherein the cladding article carrying a charge of detonating explosive is located on the cladded article so that there is a spacing between their welding surfaces which face each other, the size of the spacing being maintained by metal elements scattered on the entire surface. According to the invention, each of the metal elements which are physically separated from the cladding article and the cladded article is constructed with a cavity open at the opposite ends with walls that face the welding surfaces and confine this cavity having a substantially equal thickness which should be, at least, by one order smaller than the thickness of the cladding article mathematically defined as one-tenth, with the metal elements arranged so that a sufficient number of them would contact with their ends the welding surfaces of the two articles to reliably hold the cladding article with a charge of detonating explosive on the welding surface of the cladded article observing the pre-determined spacing prior to the moment of the explosive welding.

Owing to such metal elements, the proposed method of cladding metal elements makes it possible to obtain a welding joint of high quality with stable physico-mechanical characteristics on the entire welding surface.

Further features and advantages of the invention will become apparent from the following description of a specific embodiment which is to be read with reference to the accompanying drawings, in which FIG. 1 is a diagrammatic view of the mutual arrangement of the cladding article, metal elements and cladded article carrying a charge of detonating explosive, according to the invention;

FIG. 2 is a top view of the cladded article with the metal elements, according to the invention;

FIGS. 3a,a',b,c,d are views of possible embodiments of the metal elements, according to the invention (in the longitudinal cross-section except FIG. 3a' representing the transverse cross-section of FIG. 3a).

The invention provides a method of cladding metal articles 1 (FIG. 1) by means of explosive welding wherein the cladding plate, i.e. the cladding article 2 carrying a charge 3 of an explosive with a detonator 4, is located on the article 1 to be cladded so that a spacing $h$ is provided between their welding surfaces A and B facing each other.

The uniform value of the spacing is maintained throughout the entire welding surface by means of scattered metal elements 5 (FIGS. 1 and 2).

According to the invention each of the metal elements 5 which are physically separated from the cladded article I and the cladding article 2, are constructed with a cavity C (FIG. I) open at the opposite ends to eliminate the formation of air bubbles in the course of welding, with the ends of the walls 6 confining this cavity, facing the welding surfaces A and B of the articles I and 2. The walls 6 of the metal elements are substantially of the same thickness which should be, at least, by one order smaller than the thickness of the cladding article 2. The metal elements 5 are so located that a sufficient number of them with the said ends would directly contact the welding surfaces A and B of the both articles to hold reliably the cladding article 2 with a charge of detonating explosive 3 of the calculated height H on the welding surface A of the cladded article I with the pre-determined spacing $h$ prior to the moment of explosive welding.

The metal elements 5 owing to such a design (cavity, small thickness of walls as compared to the thickness of the cladding article) and to such an arrangement on the cladded article I, possess a sufficient static rigidity and have a steeply increasing strength characteristic. This ensures the sufficient speed of the metal elements during the explosive welding and their being welded with the two surfaces involved in the welding process, providing a high-quality welding joint with stable physico-mechanical characteristics over the entire welding surface.

The value of the spacing $h$ and the calculated height H are determined by the method familiar to those skilled in the art.

The metal elements 5 constructed according to the invention with a height equal to the value of the spacing $h$ between the welding surfaces, can have various configurations, as is shown in FIG. 3.

The metal element 5 shown in FIGS. 3a and a' is a hollow trihedron prism whose edge 7 is equal to the value of the spacing $h$ and the wall, being of a thickness $\delta$, forms the cavity Ca.

The metal elements having one edge less, i.e. in crossection they have a V-shape, can be as successfully used.

In FIG. 3b the metal element 5 is represented in the form of a hollow cylinder with the generatrix 8 equal to the value of the spacing $h$ and the wall, being of a thickness $\delta$, forms the cavity Cb. The metal element shown in FIG. 3c has a form of a hollow truncated cone whose height is equal to the value of the spacing $h$ and the wall, being of a thickness $\delta$, forms the cavity Cc.

In FIG. 3d the metal element 5 is represented in the form of a semi-sphere with an external radius R equal to the value of the spacing $h$ and the wall, being of a thickness $\delta$, forms the cavity Cd open at the opposite ends by means of holes D and d'.

The method of cladding metal articles is carried out in the following manner.

The cladded (welding) surface A of the article I is prepared in advance in a manner familiar to those skilled in the art, for example, it is cleared with an abrasive tool and degreased.

The metal elements 5 that are also degreased in advance are located on the prepared surface A of the article I. The degreasing of the metal element 5 prior to arranging it on the surface of the cladded article is necessary for obtaining a higher-quality joint between the elements and the cladding and cladded articles in the course of welding. The height of these metal elements is equal to the value of the pre-determined spacing $h$ between the welding surfaces of the articles.

The pitch $t$ (FIG. 2) between the metal elements 5 depends on the weight of the cladding plate 2 with charge 3 of detonating explosive and on the structural carrying capacity of the metal elements.

Thus, for example, while cladding articles with a 5 mm sheet of stainless steel, the total weight of one square metre of such a cladding article together with the charge of detonating explosive has amounted to 90 kg.

The metal elements used in this case to maintain the spacing $h$ between the welding surfaces had a form of a hollow truncated cone (FIG. 3c) with the diameter of the lower base equal to $2h$ and the diameter of the upper base equal to $h$ (or in the form of a hollow semi-sphere (FIG. 3d), were made from stainless steel with a thickness $\delta$ of walls equal to 0.15 mm and a height of 8 mm (i.e. the spacing $h = 8$ mm), each one having a carrying capacity of 40–42 kg and being uniformly spaced on 1 $m^2$ of the cladded article in groups of four elements. Such elements were located with a pitch equal to 1 metre ($t=1$ m).

It has been found out that it is most expedient to make use of the metal elements 5 represented in FIGS. 3a and 3b in case of cladding with a relatively thick sheet (over 10 mm).

These metal elements have a high carrying capacity due to their structural design according to which the walls of the elements, forming the cavity, are perpendicular to the welding surfaces. The metal elements represented in FIGS. 3c and 3d are most expedient to be used in case of cladding with a sheet not thicker than 10 mm.

It is also advisable to use these elements to ensure a high-quality welding joint.

Then the cladding article 2 carrying the charge 3 of detonating explosive is placed on the metal elements 5.

In case the cladding article has large dimensions (about 20 m²), and in such a case it will be welded itself, having, therefore, certain deviations from being flat, it is expedient to attract by force the cladding article to the cladded article in those places where the surface B of the cladding article does not contact the ends of the metal elements to obtain the contact by any method suitable for the purpose (e.g. by means of bolted connections arranged along the periphery of the cladding sheet).

This contributes to a more uniform spacing h between the welding surfaces A and B making it possible to obtain stable parameters (height and pitch) of the waves in the welding joint and, consequently, substantially similar physico-mechanical characteristics over the entire welding surface.

Thus a system is obtained ready to be cladded. Since the metal elements 5 (FIG. 1) have substantially the same height, the cladding process is, consequently, conducted according to a parallel diagram. At the moment of the explosion of the charge 3 initiated by the detonator 4 the cladding plate 2 under the effect of an explosive pulse attains a certain speed moving in the direction of the cladded article I. As this takes place, the metal elements 5 constructed according to the present invention and having a steeply increasing strength characteristic under the effect of the abrupt movement of the cladding article 2 instantaneously lose their stability without exercising any essential resistance to the acceleration of the cladding article 2 in the course of welding and, therefore, not requiring any increase in the charge 3 of detonating explosive.

Besides, owing to a low mass of the metal elements due to their design characteristics and their arrangement, these metal elements at the moment of explosion attain a speed sufficient for obtaining a reliable joint with the two welding surfaces, thus excluding incomplete fusions causing the appearance of cracks in the course of application of the bonded article. A great advantage of such elements, being physically separated from the cladding and cladded articles, is that in the disclosed method the flatness of the welded surfaces is not distorted and, consequently, at the moment of explosion, the wave formation along the line of their connection develops normally which also contributes to obtaining uniform qualities of the welding joint over the entire welding surface. With this object in mind, it is most advisable to fabricate the metal elements from the material of the cladding or cladded articles.

It has been found out that the metal elements remain after welding in the joint at their initial places.

This makes it possible to "control" the location of the elements arranging them, if possible, in places to be removed from the article after welding (periphery allowances or places of prospective holes) which is especially important with responsible articles where even a slight non-uniformity of the joint is not allowed.

The metal elements according to the disclosed method of bonding, have a simple structural design. They can be successfully constructed by mass-production methods at a low cost ensuring rather stable characteristics, such as the thickness of the walls, the height providing the spacing h, the strength and the mass, all this rendering them advantageous as compared to metal elements provided by the known methods by which it is impossible to obtain stable parameters.

What is claimed is:

1. In a method of cladding metal articles by explosive welding, including positioning a cladding article carrying a charge of detonating explosive in spaced relationship with a metal article forming a base member which is to be cladded therewith so as to provide a uniform spacing between their mutually facing welding surfaces, the improvement comprising: locating a plurality of upright, thin-walled hollow scattered elements at intervals over the entire welding surface between said cladding article and said base member; each said metal elements having a cavity open at opposite ends facing the respective welding surfaces of said base member and cladding article, the thickness of the walls of said hollow member being substantially constant along the height thereof and of at least one order smaller than the thickness of said cladding article; said metal elements being arranged so that a predetermined number of their ends surfaces concurrently form direct contacts with the welding surfaces of said cladding article and said base member so as to maintain said cladding article, together with the charge of detonating explosive, in contact with the welding surface of said base member, and maintain said spacing prior to the instant of explosive welding.

* * * * *